United States Patent [19]
Kempas

[11] Patent Number: 4,665,605
[45] Date of Patent: May 19, 1987

[54] METHOD OF MAKING DYNAMICALLY TUNED GIMBAL SUSPENSION

[75] Inventor: Hagen Kempas, Überlingen/Bodensee, Fed. Rep. of Germany

[73] Assignee: Bodenseewerk Gerätetechnic GmbH, Überlingen/Bodensee, Fed. Rep. of Germany

[21] Appl. No.: 841,433

[22] Filed: Mar. 19, 1986

Related U.S. Application Data

[63] Continuation-in-part of Ser. No. 484,134, Apr. 12, 1983, Pat. No. 4,592,242.

[30] Foreign Application Priority Data

Apr. 14, 1982 [DE] Fed. Rep. of Germany ....... 3213720

[51] Int. Cl.$^4$ .................. B23P 11/00; B23P 13/04
[52] U.S. Cl. ...................... 29/434; 29/557; 74/5 F
[58] Field of Search .............. 29/434, 557; 74/5 F; 308/2 A; 464/7 B; 204/129.1, 129.35; 219/7.5, 68

[56] References Cited

U.S. PATENT DOCUMENTS

| | | | |
|---|---|---|---|
| 3,354,726 | 11/1967 | Krupick et al. | 74/5 F |
| 3,529,477 | 9/1970 | Quermann | 74/5 F |
| 3,538,776 | 11/1970 | Macor et al. | 74/5 F |
| 3,678,764 | 7/1972 | Erdley et al. | 74/5 F |
| 3,700,290 | 10/1972 | Ensinger | 308/2 A |
| 3,856,366 | 12/1974 | Weisbord et al. | 308/2 A |
| 4,269,072 | 5/1981 | Duncan | 74/5 F |
| 4,464,942 | 8/1984 | Krupick | 74/5 F |

Primary Examiner—Mark Rosenbaum
Assistant Examiner—Irene Graves Golabi
Attorney, Agent, or Firm—Lee, Smith & Zickert

[57] ABSTRACT

A ring element on the driving side and a ring element on the rotor side and a gimbal arrangement with two gimbals are formed by two coaxial, cylindrical rings, wherein peripheral cuts, having deflected ends are provided in the rings. The peripheral cuts separate the portions of the ring elements from the gimbals. The ends form leaf springs which form flexural pivots. One leaf spring is connected to the ring element on the driving side and the other leaf spring is connected to the ring element on the driven side. The cuts are produced by electroerosion. Each of the cuts is symmetrical with respect one of two planes extending at right angles to each other.

2 Claims, 16 Drawing Figures

METHOD OF MAKING DYNAMICALLY TUNED GIMBAL SUSPENSION

RELATED APPLICATION

This application is a continuation-in-part of U.S. patent application Ser. No. 484,134, filed Apr. 12, 1983, and now U.S. Pat. No. 4,592,242.

TECHNICAL FIELD

The invention relates to a method for making, by electroerosion, a dynamically tuned gimbal suspension for supporting a gyro rotor with two degrees of freedom.

BACKGROUND ART

In a conventional two-axis, dynamically tuned gyro the rotor is connected to the drive shaft of the motor through a gimbal, which is connected on one hand to the drive shaft and on the other hand to the rotor through spring joints. With deflection of the gyro housing relative to the gyro rotor the spring joints would normally exert a torque on the gyro rotor, which causes this rotor to change its reference attitude in space. In a dynamically tuned gyro the tuning is selected such that the torques caused by the spring joints are compensated by dynamic torques. These dynamic torques are caused by an oscillating motion of the gimbal which occurs when the gyro housing is deflected relative to the space-fixed gyro rotor.

In such dynamically tuned gyro it is known to provide two or more concentrically arranged gimbals (U.S. Pat. No. 3,678,764). With appropriate selection of the moments of inertia of the gimbals errors may be eliminated which occur due to a "rectifier effect" with external vibrations at twice the gyro rotary speed. The gyro of U.S. Pat. No. 3,678,764 requires hight precision and thus high manufacturing expenditure.

By German Pat. No. 2,429,913 a gyro assembly with dynamically tuned gimbal suspension of the rotor on the drive shaft is known, in which the gimbal suspension comprises three gimbals, each of which is connected with the rotor and the shaft through flexural pivots angularly offset by 90°. The corresponding flexural pivots of different gimbals are offset by 120°. Gimbals are formed of cylindrical gimbal rings. They are connected with the rotor and the driving shaft through pairs of diametrically opposite flexural pivots. The gimbals are arranged concentrically one within the other. Also this construction is made of many individual parts and therefore expensive.

Furthermore cardan joints with spring elements are known, in which the spring elements are heavily restricted bending rods (German Pat. Nos. 1,281,216, 1,947,893 and 2,150,604). In these bending rods the range which may be deformed is reduced to a minimum. This causes high material tensions in the marginal zones, when the rod is deflected.

U.S. Pat. No. 3,700,290 discloses a dynamically tuned gimbal suspension for supporting a gyro rotor with two degrees of freedom comprising first and second generally hollow-cylindrical rings. The second ring is arranged coaxially to the first ring. Each of the rings has two pairs of axially spaced generally peripheral cuts. Each pair of cuts of the first ring defines, therebetween, a pair of diametrically opposite axially extending bending springs. The bending springs defined by one of the pairs of cuts are angularly spaced by 90° from the bending springs defined by the other pair of cuts. In similar manner, each pair of cuts of the second ring defines, therebetween, a pair of diametrically opposite, peripherally extending bending springs. Again the bending springs defined by one of the pairs of cuts are angularly spaced by 90° from the bending springs defined by the other pair of cuts. Thus the cuts divide the first and second rings into three ring portions each, which are flexibly interconnected by bending springs. The ring portions of the first and second rings are interconnected such that the peripheral and axial bending springs form flexural pivots. The median ring portions form gimbals. The end portions of the rings are interconnected and connected to the gyro rotor and to driving means, respectively.

The cuts in this gimbal suspension are very unsymmetrical and comprise a combination of both cuts proper and circular bores. This makes manufacturing complex and costly.

In addition the bending springs of U.S. Pat. No. 3,700,290 are defined by the circular bores and therefore buckle substantially about a single point, namely the point of the heaviest restriction. This causes high material stresses in the marginal zones when deflection occurs.

DISCLOSURE OF INVENTION

It is the object of the invention to provide a method for making a gimbal suspension of the type described above such that it may be manufactured with low expenditure.

According to the invention a method for making, by electroerosion, a dynamically tuned gimbal suspension for supporting a gyro rotor with two degrees of freedom, comprises the steps of (a) making a first, generally hollow-cylindrical ring having an axis, a first end and a second end and a peripheral surface and defining a radial direction, an axial direction and a peripheral direction, (b) making a second, generally hollow-cylindrical ring having an axis, a first end and a second end and a peripheral surface and defining a radial direction, an axial direction and a peripheral direction, (c) applying to said first ring a first pair of erosion cuts by electroerosion using erosion wire means, said erosion cuts starting at diametrically opposite points of said peripheral surface, said points being located in a first plane containing said axis of said first ring, the erosion wire means, for making each of the cuts of said first pair, being moved from said respective point of said peripheral surface in a radial direction and in an axial direction relative to said first ring to make a cut which is symmetric to said first plane and terminates in straight peripheral end portions, adjacent end portions of the cuts of said first pair being axially spaced and overlapping to define a pair of peripherally extending, diametrically opposite leaf springs therebetween.

(d) applying to said first ring a second pair of erosion cuts by electroerosion using erosion wire means, said erosion cuts starting at diametrically opposite points of said peripheral surface, said points being located in a second plane containing said axis of said first ring and extending at a right angle to said first plane, the erosion wire means, for making each of the cuts of said second pair, being moved from said respective point of said peripheral surface in a radial direction and in an axial direction relative to said first ring to make a cut which is symmetric to said second plane and terminates in straight peripheral end portions, adjacent end portions of said cuts of said second pair being axially spaced and overlapping to define peripherally extending, diametrically opposite leaf springs therebetween, whereby said first ring is divided by said first and second pairs of cuts into a first ring portion adjacent said first end, a second ring portion adjacent said second end, and a median first gimbal portion therebetween, (e) applying to said second ring a third pair of erosion cuts by electroerosion using erosion wire means, said erosion cuts starting at diametrically opposite points of said peripheral surface, said points being located in a third plane containing said axis of said second ring, the erosion wire means, for making each of the cuts of said third pair, being moved from said respective point of said peripheral surface in a radial direction and in an axial direction relative to said second ring to make a cut which is symmetric to said third plane and terminates in straight axial end portions, adjacent end portions of the cuts of said first pair being peripherally spaced to define axially extending, diametrically opposite leaf springs therebetween, (f) applying to said second ring a fourth pair of erosion cuts by electroerosion using erosion wire means, said erosion cuts starting at diametrically opposite points being located in a fourth plane containing said axis of said second ring and extending at a right angle to said third plane, the erosion wire means, for making each of the cuts of said fourth pair, being moved from said respective point of said peripheral surface in a radial direction and in an axial direction relative to said second ring to make a cut which is symmetric to said fourth plane and terminates in straight axial end portions, adjacent end portions of the cuts of said fourth pair being peripherally spaced to define axially extending, diametrically opposite leaf springs therebetween, whereby said ring is divided by said third and fourth pairs of cuts into a third ring portion adjacent said first end, a fourth ring portion adjacent said second end and a median second gimbal portion therebetween, (g) placing said first and second rings coaxially one within the other such that said first and third planes coincide and said second and fourth planes coincide and each of said peripherally extending leaf springs is arranged crosswise to a respective one of said axially extending leaf springs, (h) interconnecting said first and third ring portions to form a first ring element for connection to said gyro rotor, and (i) interconnecting said second and fourth ring portions to form a second ring element for connection to drive means.

Said first and second rings can initially be formed on a lathe.

A gimbal suspension made by this method consists of lathe works only, in which the peripheral cuts are provided by electroerosion. The erosion cuts start always at the outer contour of the lathe work. Thus it is not necessary to thread the erosion wire throught bores. No material pieces cut free are developed by the electroerosion of the peripheral cuts which pieces may cause the erosion wire to break. The erosion wire is active only during the advance phase. the processing time may thus be reduced further by fast return of the wire. It is possible without high expenditure to automate the application of the peripheral cuts to the gimbal suspension.

BRIEF DESCRIPTION OF DRAWINGS

An embodiment of the invention will now be described in greater detail with reference to the accompanying drawings.

BEST MODE OF CARRYING OUT THE INVENTION

Figure 1:
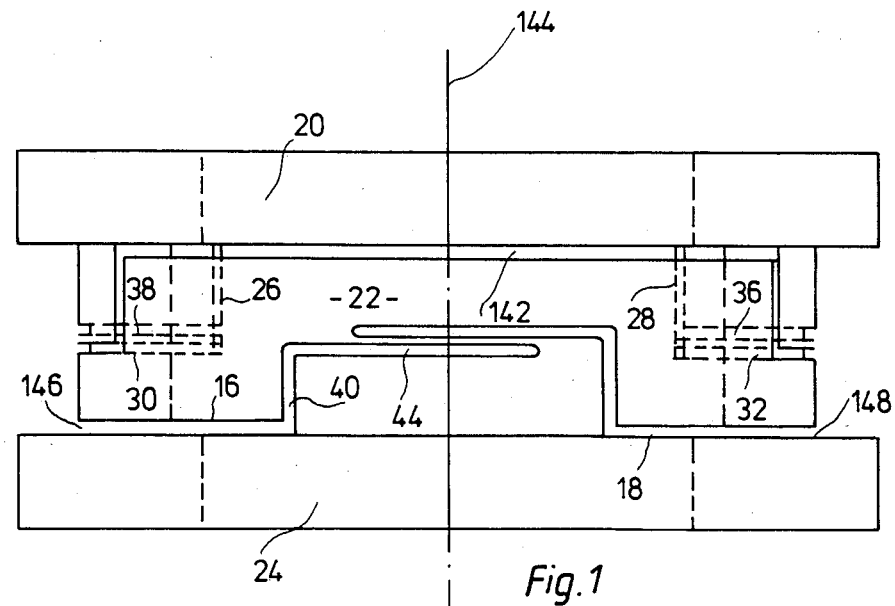
FIG. 1 shows a side elevation of a first hollow-cylindrical ring with peripheral cuts for forming an annular portion on the driving side and an annular portion on the rotor side and a first gimbal.

A first hollow-cylindrical ring 10 has a first pair of peripheral cuts 12,14 and a second pair of peripheral cuts 16,18. The pairs of peripheral cuts 12,14 and 16,18 are axially offset. They subdivide the first ring 10 in an upper annular portion 20, as viewed in FIG. 6, forming part of a ring element on the rotor side, which will be described hereinbelow, a first gimbal 22 in the center and a lower annular portion 24, as viewed in FIG. 6, forming a ring element on the driving side, which will be described hereinbelow.

Figure 2:
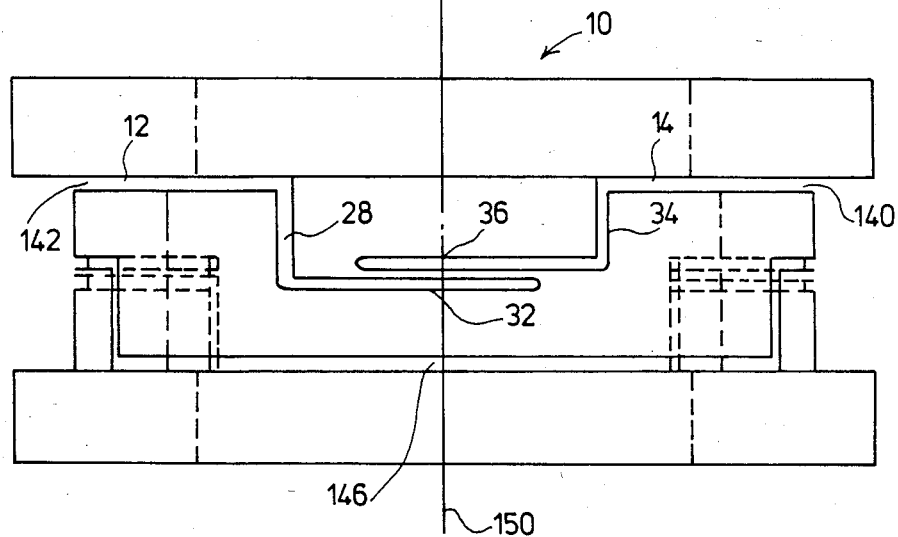
FIG. 2 shows a side elevation of this first ring as viewed at a right angle to the direction of view of FIG. 1.

The peripheral cuts 12,14,16,18 extend through a little more than 180°. They have z-shaped ends extending toward the middle. The peripheral cut 12 has for example at its ends axial sections 26 and 28 extending downward in FIG. 6, which are followed in turn by legs 30 and 32, respectively, extending in peripheral direction. Correspondingly the peripheral cut 14 has at its ends sections like 34 in FIG. 2 extending axially downward in FIG. 2 or 6, which also are followed by legs 36 and 38 extending in the peripheral direction.

Figure 6:
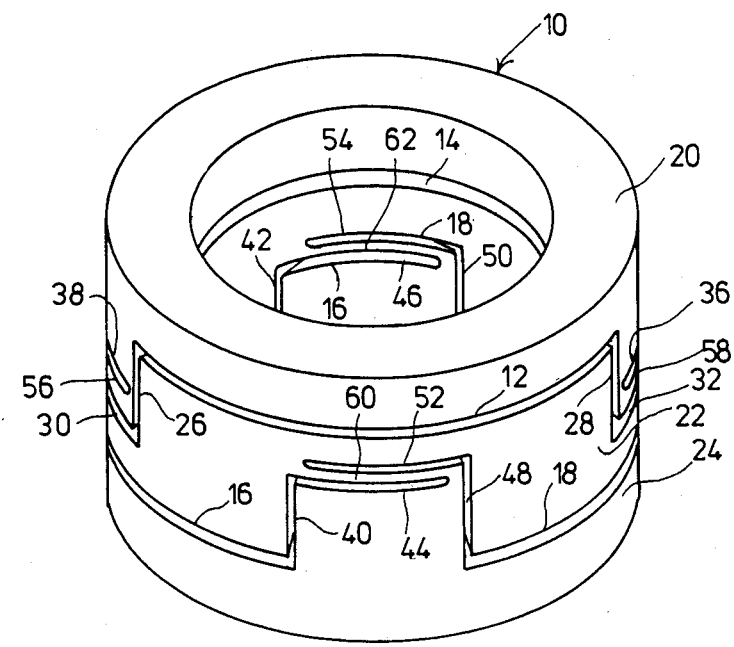
FIG. 6 is a schematic-perspective illustration of the first ring.

The peripheral cut 16 has at its ends sections 40 and 42 extending axially toward the middle, that is upward in FIG. 6, which are followed by legs 44 and 46, respectively, extending in the peripheral direction. Correspondingly the peripheral cut 18 has at its ends sections 48 and 50 extending axially upward in FIG. 6, which are followed by legs 52 and 54, respectively, extending in peripheral direction. The two legs 30,38; 32,36 and 44,52; 46,54, respectively, offset toward the middle at adjacent ends of the peripheral cuts 12,14 and 16,18, respectively, of a pair overlap forming a leaf spring 56,58 and 60,62, respectively, extending in the peripheral direction. The two pairs of peripheral cuts 12,14 and 16,18 are angularly offset by 90°. Correspondingly the two pairs of diametrically opposite leaf springs 56,58 and 60,62 formed thereby are offset by 90°.

The center portions of the peripheral cuts 12 and 14 are located in one plane in the upper portion of the ring 10. In the same way the center portions of the peripheral cuts 16 and 18 are located in a plane in the lower portion of the ring 10. The legs 36,38 and 52,54 are located in a common plane, and the legs 30,32 and 44,46 are located in a common plane axially displaced a little relative to the plane of the legs 36 etc.

It may be seen that the annular portions 20 and 24 and the first gimbal 22 therebetween are formed out of a monolithic ring 10 by the peripheral cuts 12,14,16 and 18. The gimbal 22 is connected to the annular portion 24 through the two diametrically opposite leaf springs 60,62. The gimbal 22 is furthermore connected to the annular portion 20 though the two diametrically opposite leaf springs 56,58 angularly offset by 90° relative to the leaf springs 60,62.

A second hollow-cylindrical ring 64 has two pairs of peripheral cuts 66,68 and 70,72. The peripheral cuts 66,68 are axially displaced relative to the peripheral cuts 70,72. By the pairs of peripheral cuts 66,68 and 70,72 the second ring 64 is subdivided into three portions, namely an annular portion 74 on the rotor side, a second gimbal 76 and an annular portion 78 on the driving side. In FIG. 6 the annular portion 78 on the driving side is connected to a driving shaft 80.

The peripheral cuts 66,68 and 70,72 extend through a little less than 180°. Its ends extend at a right angle toward the middle such that they form sections extending in the axial direction. The peripheral cut 66 forms sections 82 and 84 extending in the axial direction downward in FIG. 7. The peripheral cut 68 forms sections 86 and 88 extending in the axial direction downward in FIG. 7. The peripheral cut 70 forms sections 90 and 92 extending in the axial direction upward in FIG. 7, and the periheral cut 72 forms corresponding sections extending in the axial direction upward in FIG. 7, of which only one section 94 can be seen in FIG. 3. The two sections extending at a right angle at adjacent ends of the peripherical cuts of a pair are parallel and form a leaf spring extending in the axial direction: The sections 82 and 86 of the peripheral cuts 66 and 68, respectively, form a leaf spring 98, and the sections 84 and 88 of the peripheral cuts 66 and 68, respectively, form a leaf spring 100. The sections 90 and 94 of the peripheral cuts 70 and 72, respectively, form a leaf spring 102. The sections 92 and 96 of the peripheral cuts 70 and 72, respectively, form a leaf spring 104. The two pairs of peripheral cuts 66,68 and 70,72 are angularly offset by 90°. Correspondingly the leaf springs 98,100 and 102,104 are also offset by 90°.

Figure 7:
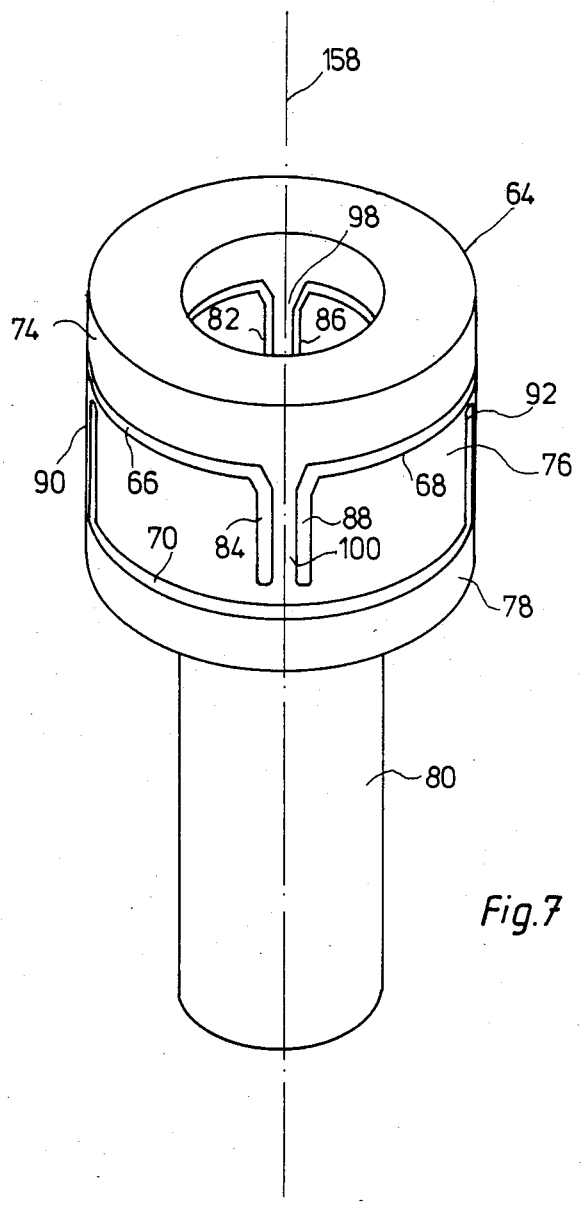
FIG. 7 is a schematic-perspective illustration of the second ring with the drive shaft.

It can be seen from FIG. 7 that the annular portion 74 on the rotor side is connected to the second gimbal 76 through the leaf springs 98 and 100. The gimbal 76 is connected to the annular portion 74 on the driving side through the leaf springs 102 and 104.

Figure 8:
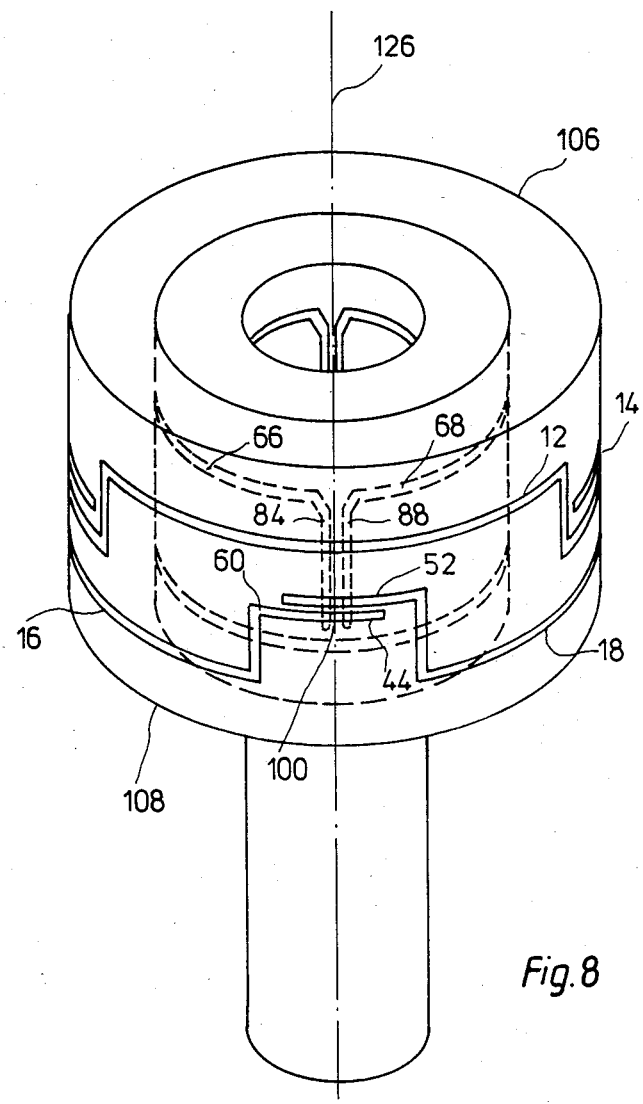
FIG. 8 is a schematic-perspective illustration of the gimbal suspension obtained by assembling the rings of FIGS. 6 and 7.

FIG. 8 shows the gimbal suspension in the assembled state.

The two hollow-cylindrical rings 10 and 64 are coaxially arranged, the ring 64 being located within the ring 10. The annular portion 74 is connected to the annular portion 20. These two annular portions 74 and 20 together form the ring element 106 on the rotor side. The annular portion 78 is connected to the annular portion 24. These two annular portions 78 and 24 together form the ring element 108 on the driving side. The two gimbals are coaxially arranged between the gimbals 106 and 108. The gimbals are connected to the ring elements 106 and 108 through the leaf springs.

As can be seen from FIG. 8, the hollow-cylindrical rings 10 and 64 are so arranged relative to each other that each leaf spring of one ring crosses a leaf spring of the other ring.

Figures 3, 4:
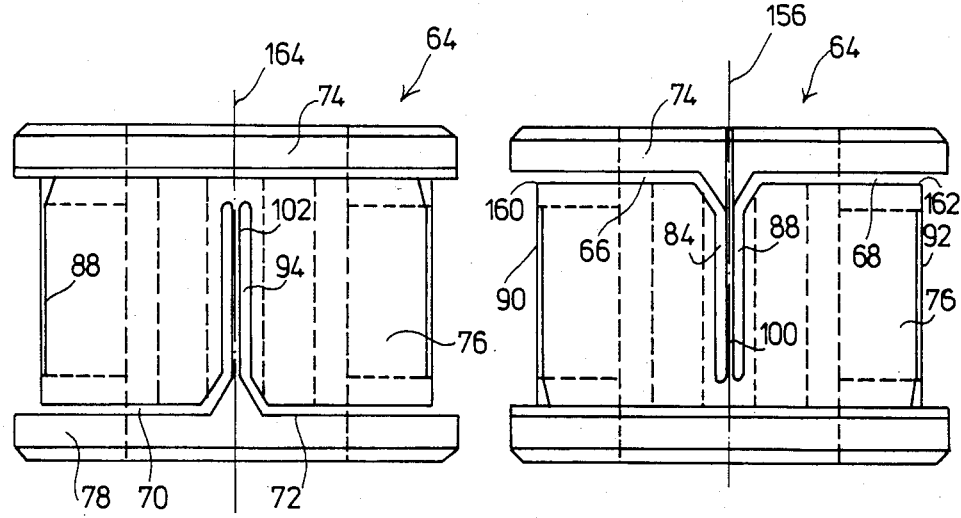
FIG. 3 shows a side elevation of a second hollow-cylindrical ring with peripheral cuts for forming an annular portion on the driving side and an annular portion on the rotor side and a second gimbal.
FIG. 4 shows a side view of this second ring as viewed at a right angle to the direction of view of FIG. 3.
Figure 5:
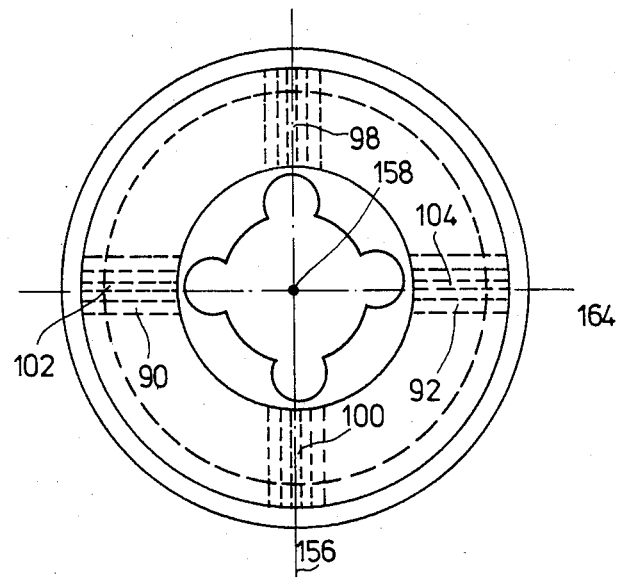
FIG. 5 shows a plan view of the second ring.

In FIG. 8 the leaf spring 60 extending in peripheral direction and connecting the annular portion 24 to the first gimbal is arranged crosswise to the leaf spring 100 extending in axial direction and connecting the annular portion 74 to the second gimbal 76. In a corresponding way not shown in FIG. 8, the leaf spring 62 is arranged crosswise to the leaf spring 98. In a similar way the leaf springs 56 and 58 extending in peripheral directions and connecting the annular portion 20 on the rotor side to the first gimbal 22 cross the leaf springs 102 and 104 extending in the axial direction and connecting the annular portion 78 to the second gimbal 76. Thus four flexural pivots are formed in which respectively one leaf spring is connected to the ring element 108 on the driving side and the other leaf spring is connected to ring element 106 on the rotor side. Thus the ring 64 in the side view of FIG. 4 is mounted within the ring 10 of FIG. 1.

The arrangement is very rigid against translatory motions. The described construction is particularly suitable for the miniaturization, as the gimbal suspension is obtained by cuts only, which are provided by electroerosion with a width of for example 0.2 millimeters, as will be described hereinbelow.

Only eight cuts are required to form four flexural pivots with a total of eight leaf springs. The cuts required for producing the leaf springs cause at the same time also the separation of the gimbals 22 and 76 from the annular portions 20,24 and 74,78, on the driving and on the rotor side, respectively.

The method of making the gimbal suspension is illustrated in FIGS. 9 to 16.

Figure 10:
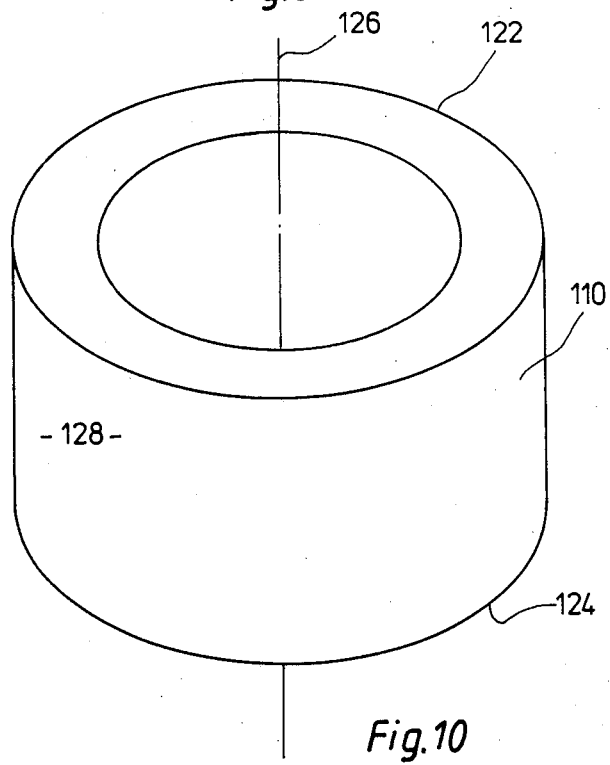
FIG. 10 shows a lathe work from which the outer ring is to be made.
Figure 9:
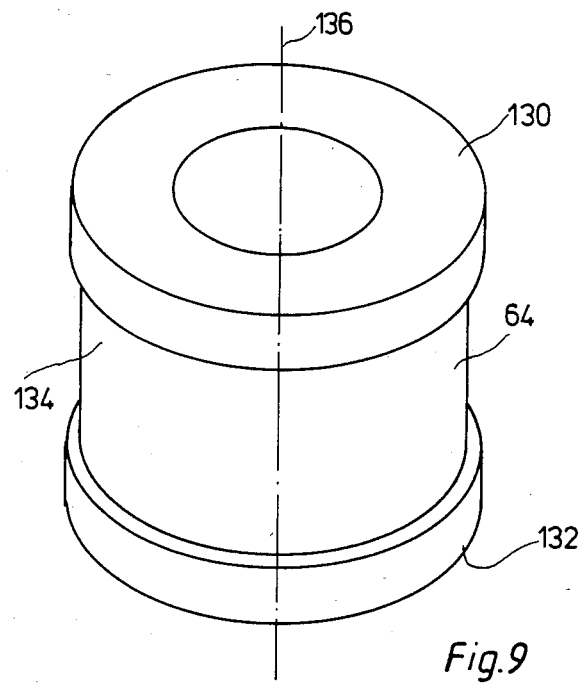
FIG. 9 shows a lathe work from which the inner ring is to be made.

A first, generally hollow cylindrical ring 10 is formed as a lathe work, as illustrated in FIG. 10. A second, generally hollow cylindrical ring 64 is formed as a lathe work, as illustrated in FIG. 9. the ring 10 has a first end 122 and a second end 124. The axis 126 of the hollow cylinder defines an axial direction. The ring has a peripheral surface 128. Similarly the second ring 64 has a first end 130 and a second end 132 and a peripheral surface 134. The axis 136 of the hollow cylinder defines an axial direction.

Figure 16:
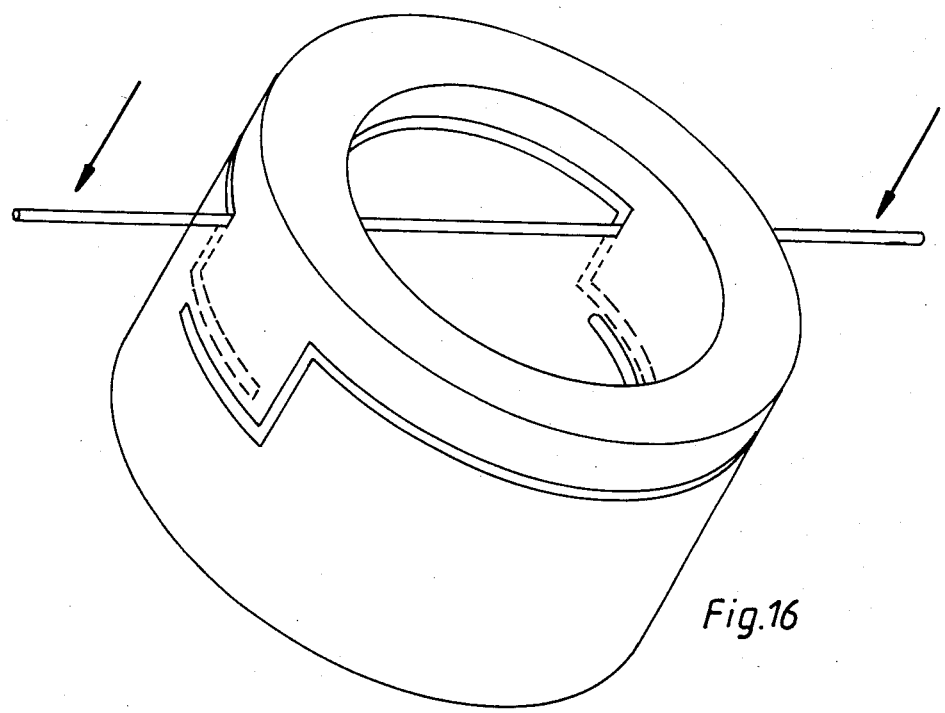
FIG. 16 shows the erosion wire of FIG. 15 after having been moved further inwardly and now moving in axial direction.
Figure 15:
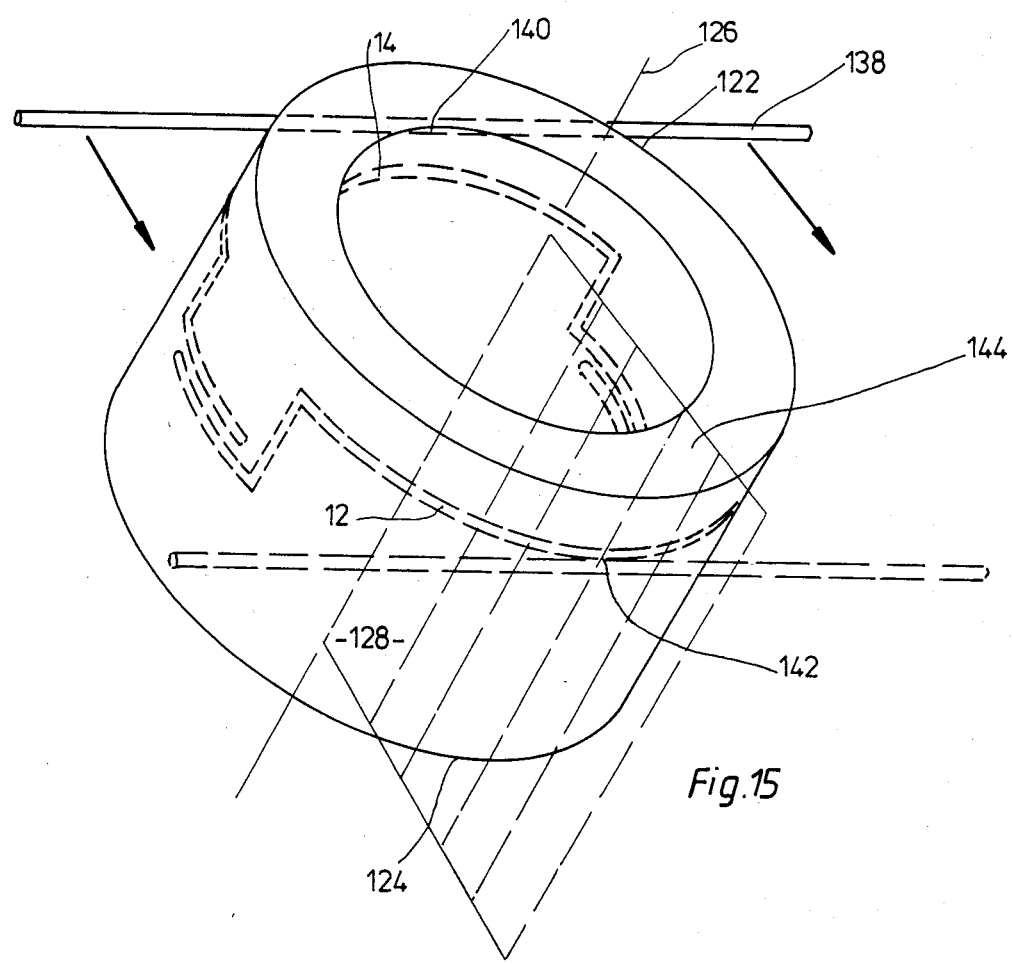
FIG. 15 shows, how a cut is going to be made in the outer ring by an erosion wire starting from the outer contour of the lathe work.

As illustrated in FIGS. 15 and 16, a first pair of generally peripheral erosion cuts 12,14 is applied to the first ring 10 using an erosion wire 138. As shown in FIG. 15, the erosion cut 14 starts at a point 140 of the peripheral surface 134. The erosion cut 12 starts at a point 142 of the peripheral surface as shown in dashed lines in FIG. 15. The points 140 and 142 are diametrically opposite and located in a first plane 144 containing the axis 126 of the first ring 10. The erosion wire 138, for making each of the cuts, is moved from the respective point 140 or 142 of the peripheral surface 128 in the radial direction and in the axial direction (as shown in FIG. 16) relative to ring 10 and then in the radial direction again to make a cut which is symmetric to the first plane 144 and terminates in straight peripheral end portions 36,38 and 30,32, respectively, as described above with reference to FIGS. 2 and 6. Adjacent end portions 32,36 and 30,38, respectively overlap and define a pair of peripherally extending, diametrically opposite leaf springs 56 and 58 therebetween, as described hereinbefore.

After each cut 12 or 14 has been applied, the erosion wire 138 is de-activated and its movement is reversed, the wire being removed from the cut at an increased speed.

A second pair of erosion cuts 16 and 18 is applied to the first ring in substantially the same manner. This has not been illustrated in detail. These cuts start from diametrically opposite points 146 and 148 (FIG. 1), which are located in a second plane 150 (FIG. 2) containing the axis 124 and extending at a right angle to the first plane 144. This second plane is parallel to the plane of the paper in FIG. 1.

A third pair of erosion cuts 70 and 72 is applied to second ring 64, as shown in FIGS. 11 to 14. These erosion cuts start at diametrically opposite points 152 and 154 of the peripheral surface 134, which are located in a third plane 156 containing the axis 158 of ring 64. This is illustrated in FIG. 1, in which the erosion wire 138 when making cut 70 is shown in dashed lines.

Figure 12:
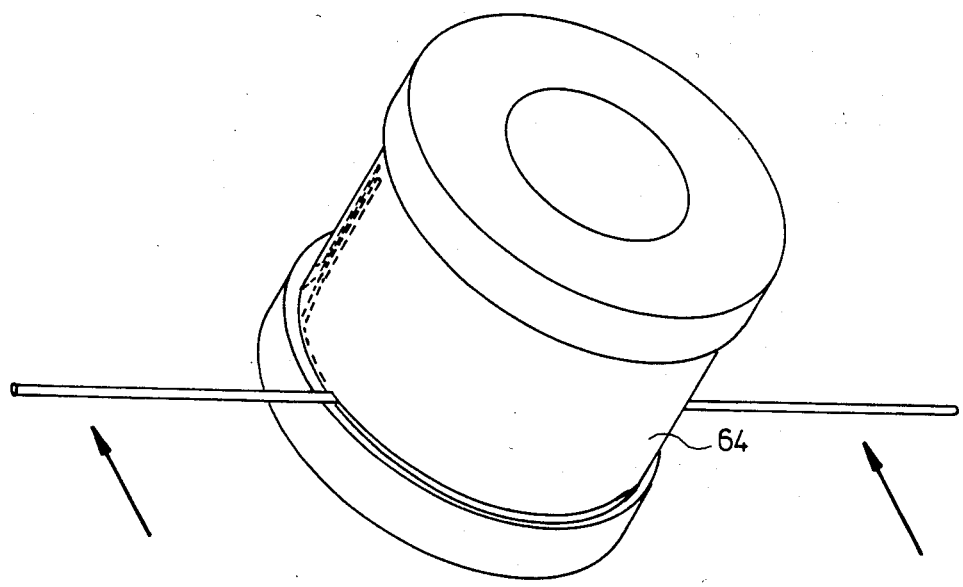
FIG. 12 shows the step of making a cut in the inner ring, after the erosion wire has advanced a certain distance radially inwards.
Figure 11:
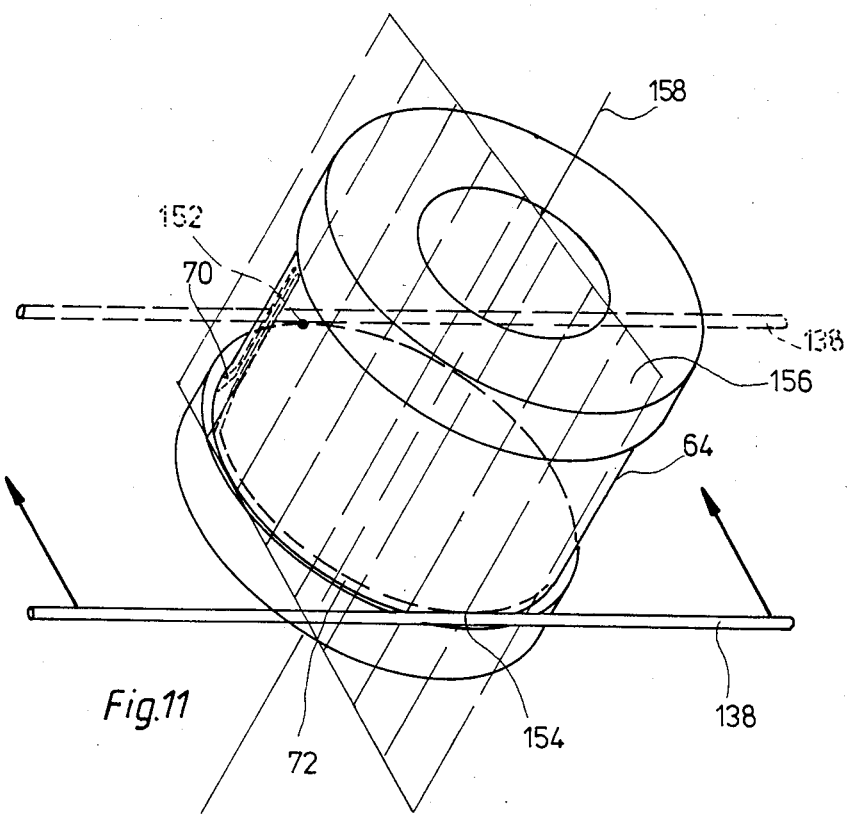
FIG. 11 shows, how a cut is going to be made in the inner ring, by an erosion wire starting from the outer contour of the lathe work.
Figure 13:
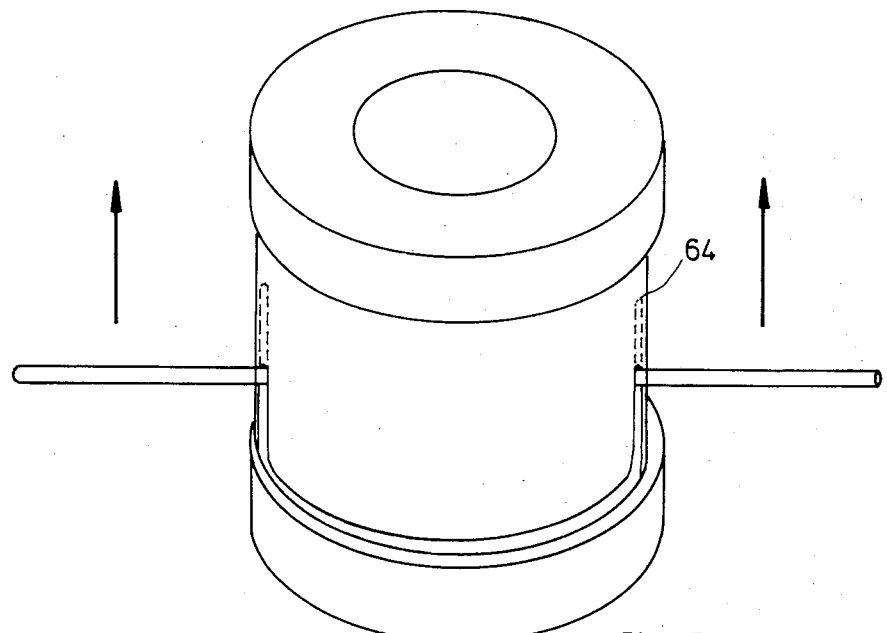
FIG. 13 shows the erosion wire of FIG. 10 after having been moved further inwardly and now moving in axial direction to cut the two straight axial end portions of the cut simultaneously.

The erosion wire 138, for making each of the cuts of the third pair, is moved from the respective points 152 and 154 of the peripheral surface 134 in the radial direction, as shown in FIG. 12, and then in the axial direction, as shown in FIG. 13, relative to ring 64 to make a cut which is symmetric to the above mentioned third plane 156 and terminates in straight axial end portions 90,92. Adjacent end portions 90,94 and 92,96 of the cuts 70,72 are peripherally spaced to define axially extending, diametrically opposite leaf springs 102,104 therebetween.

Figure 14:
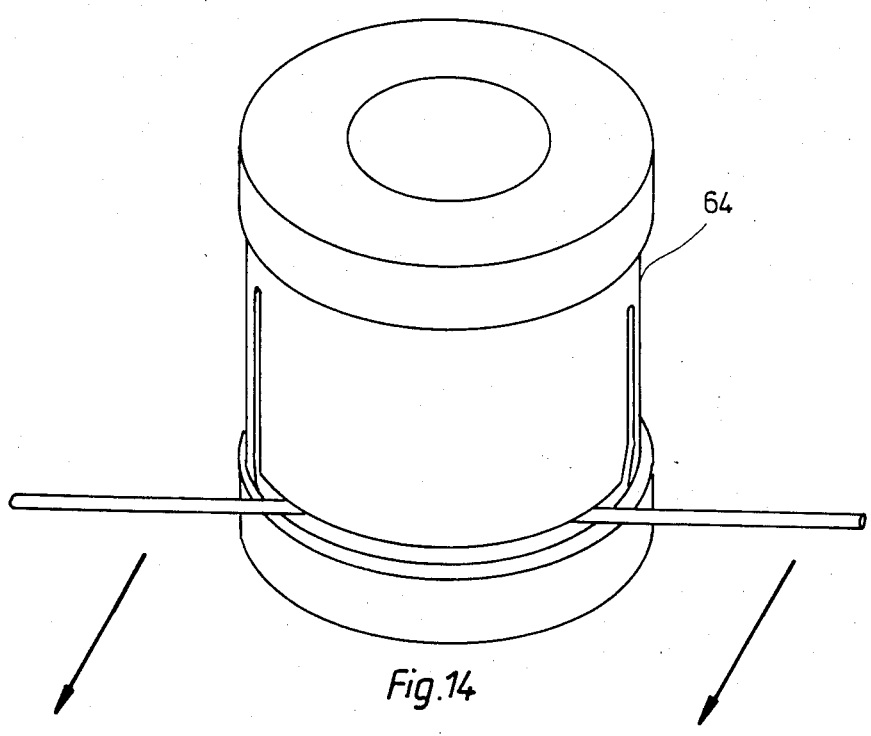
FIG. 14 illustrates the fast return of the de-activated wire after the cut has been completed.

After each cut 70 or 72 has been applied, the erosion wire 138 is again de-activated, and its movement is reversed to remove the wire from the cut at an increased speed, as illustrated in FIG. 14.

A fourth pair of erosion cuts 66 and 68 (FIG. 4) is applied to the second ring 64 in substantially the same manner. This has not been illustrated in detail. The cuts start from diametrically opposite points 160,162 which are located in a fourth plane 164 containing the axis 158 of the ring 64 and extending at an right angle to the third plane 156. This fourth plane is parallel to the plane of the paper in FIG. 1.

The first and second rings 10 and 64, respectively, are placed coaxially one within the other such that the first and third planes 144 and 156, respectively, coincide and the second and fourth planes 150 and 164, respectively, coincide. Each of the peripherally extending leaf springs 56,58 and 60,62 is then arranged crosswise to a respective one of the axially extending leaf springs 98,100 and 102,104, respectively. As explained hereinbefore, the upper annular portions 20 and 74 are interconnected to form a first ring element 106 for connection to a gyro rotor (not shown), and the lower annular portions 24 and 78 are interconnected to form a second ring element for connection to drive means.

I claim:
1. A method for making, by electroerosion, a dynamically tuned gimbal suspension for supporting a gyro rotor with two degrees of freedom, comprising the steps of:
   (a) making a first, generally hollow-cylindrical ring having an axis, a first end and a second end and a peripheral surface and defining a radial direction, an axial direction and a peripheral direction,
   (b) making a second, generally hollow-cylindrical ring having an axis, a first end and a second end and a peripheral surface and defining a radial direction, an axial direction and a peripheral direction,
   (c) applying to said first ring a first pair of erosion cuts by electroerosion using erosion wire means, said erosion cuts starting at diametrically opposite points of said peripheral surface, said points being located in a first plane containing said axis of said first ring, the erosion wire means, for making each of the cuts of said first pair, being moved from said respective point of said peripheral surface in a radial direction and in an axial direction relative to said first ring to make a cut which is symmetric to said first plane and terminates in straight peripheral end portions, adjacent end portions of the cuts of said first pair being axially spaced and overlapping to define a pair of peripherally extending, diametrically opposite leaf springs therebetween,
   (d) applying to said first ring a second pair of erosion cuts by electroerosion using erosion wire means, said erosion cuts starting at diametrically opposite points of said peripheral surface, said points being located in a second plane containing said axis of said first ring and extending at a right angle to said first plane, the erosion wire means, for making each of the cuts of said second pair, being moved from said respective point of said peripheral surface in a radial direction and in an axial direction relative to said first ring to make a cut which is symmetric to said second plane and terminates in straight peripheral end portions, adjacent end portions of said cuts of said second pair being axially spaced and overlapping to define peripherally extending, diametrically opposite leaf springs therebetween, whereby said first ring is divided by said first and second pairs of cuts into a first ring portion adjacent said first end, a second ring portion adjacent said second end, and a median first gimbal portion therebetween,
   (e) applying to said second ring a third pair of erosion cuts by electroerosion using erosion wire means, said erosion cuts starting at diametrically opposite points of said peripheral surface, said points being located in a third plane containing said axis of said second ring, the erosion wire means, for making each of the cuts of said third pair, being moved from said respective point of said peripheral surface in a radial direction and in an axial direction relative to said second ring to make a cut which is symmetric to said third plane and terminates in straight axial end portions, adjacent end portions of the cuts of said first pair being peripherally spaced to define axially extending, diametrically opposite leaf springs therebetween, (f) applying to said second ring a fourth pair of erosion cuts by electroerosion using erosion wire means, said erosion cuts starting at diametrically opposite points being located in a fourth plane containing said axis of said second ring and extending at a right angle to said third plane, the erosion wire means, for making each of the cuts of said fourth pair, being moved from said respective point of said peripheral surface in a radial direction and in an axial direction relative to said second ring to make a cut which is symmetric to said fourth plane and terminates in straight axial end portions, adjacent end portions of the cuts of said fourth pair being peripherally spaced to define axially extending, diametrically opposite leaf springs therebetween, whereby said ring is divided by said third and fourth pairs of cuts into a third ring portion adjacent said first end, a fourth ring portion adjacent said second end and a median second gimbal portion therebetween, (g) placing said first and second rings coaxially one within the other such that said first and third planes coincide and said second and fourth planes coincide and each of said peripherally extending leaf springs is arranged crosswise to a respective one of said axially extending leaf springs, (h) interconnecting said first and third ring portions to form a first ring element for connection to said gyro rotor, and (i) interconnecting said second and fourth ring portions to form a second ring element for connection to drive means.

2. A method as claimed in claim 1, wherein said first and second rings are initially formed on a lathe.

* * * * *